(12) United States Patent
Morgan et al.

(10) Patent No.: US 8,581,712 B2
(45) Date of Patent: Nov. 12, 2013

(54) METHODS AND SYSTEMS RELATED TO ESTABLISHING GEO-FENCE BOUNDARIES

(75) Inventors: Gerald A. Morgan, Littleton, CO (US); Stanley G. Schwarz, Indialantic, FL (US); Jeffrey H. Frank, Littleton, CO (US); Christopher M. Macheca, Centennial, CO (US); Michael Glancy, Highlands Ranch, CO (US)

(73) Assignee: **Gordon * Howard Associates, Inc.**, Littleton, CO (US)

( * ) Notice: Subject to any disclaimer, the term of this patent is extended or adjusted under 35 U.S.C. 154(b) by 0 days.

(21) Appl. No.: 13/490,648

(22) Filed: Jun. 7, 2012

(65) Prior Publication Data

US 2012/0242511 A1    Sep. 27, 2012

Related U.S. Application Data (63) Continuation-in-part of application No. 13/364,662, filed on Feb. 2, 2012, now Pat. No. 8,217,772, which is a continuation of application No. 13/215,732, filed on Aug. 23, 2011, now Pat. No. 8,164,431, which is a continuation of application No. 12/333,904, filed on Dec. 12, 2008, now Pat. No. 8,018,329.

(51) Int. Cl.
  *B60R 25/10*    (2013.01)

(52) U.S. Cl.
  USPC ............... 340/426.19; 340/426.18; 340/436

(58) Field of Classification Search
  USPC ............ 340/426.19, 989, 436, 425.5, 426.22, 340/426.18, 426.2, 426.1, 426.36, 539.13; 701/301
  See application file for complete search history.

(56) References Cited

U.S. PATENT DOCUMENTS

| | | |
|---|---|---|
| 4,335,370 A | 6/1982 | Scalley et al. |
| 4,592,443 A | 6/1986 | Simon |
| 4,624,578 A | 11/1986 | Green |
| 4,688,026 A | 8/1987 | Scribner et al. |
| 4,700,296 A | 10/1987 | Palmer, Jr. et al. |
| 4,738,333 A | 4/1988 | Collier et al. |
| 4,800,590 A | 1/1989 | Vaughan |
| 5,014,206 A | 5/1991 | Scribner et al. |
| 5,132,968 A | 7/1992 | Cephus |
| 5,228,083 A | 7/1993 | Lozowick et al. |
| 5,426,415 A | 6/1995 | Prachar et al. |
| 5,490,200 A | 2/1996 | Snyder et al. |
| 5,495,531 A | 2/1996 | Smiedt |

(Continued)

FOREIGN PATENT DOCUMENTS

| | | |
|---|---|---|
| EP | 1557807 | 7/2005 |
| WO | 9616845 | 6/1996 |

(Continued)

OTHER PUBLICATIONS

US 5,699,633, 10/1999, Roser (withdrawn).

(Continued)

*Primary Examiner* — Toan N Pham
(74) *Attorney, Agent, or Firm* — Michelle N. Safer; Conley Rose, P.C.

(57) ABSTRACT

Establishing geo-fence Boundaries. At least some embodiments involve detecting a vehicle has been in a collision, establishing a geo-fence boundary for the vehicle responsive to the detecting, monitoring a movement of the vehicle with respect to the geo-fence boundary, and issuing an alert if movement of the vehicle outside the geo-fence boundary is indicative of improperly departing a scene of the collision.

21 Claims, 5 Drawing Sheets

(56) References Cited

U.S. PATENT DOCUMENTS

| | | |
|---|---|---|
| 5,510,780 A | 4/1996 | Norris et al. |
| 5,619,573 A | 4/1997 | Brinkmeyer et al. |
| 5,673,318 A | 9/1997 | Bellare et al. |
| 5,708,712 A | 1/1998 | Brinkmeyer et al. |
| 5,775,290 A | 7/1998 | Staerzl et al. |
| 5,797,134 A | 8/1998 | McMillan et al. |
| 5,818,725 A | 10/1998 | McNamara et al. |
| 5,819,869 A | 10/1998 | Horton |
| 5,898,391 A | 4/1999 | Jefferies et al. |
| 5,917,405 A | 6/1999 | Joao |
| 5,970,143 A | 10/1999 | Schneier et al. |
| 6,025,774 A | 2/2000 | Forbes |
| 6,026,922 A | 2/2000 | Horton |
| 6,032,258 A | 2/2000 | Godoroja et al. |
| 6,064,970 A | 5/2000 | McMillan et al. |
| 6,088,143 A | 7/2000 | Bang |
| 6,130,621 A | 10/2000 | Weiss |
| 6,157,317 A | 12/2000 | Walker |
| 6,185,307 B1 | 2/2001 | Johnson, Jr. |
| 6,195,648 B1 | 2/2001 | Simon et al. |
| 6,249,217 B1 | 6/2001 | Forbes |
| 6,278,936 B1 | 8/2001 | Jones |
| 6,353,776 B1 | 3/2002 | Rohrl et al. |
| 6,370,649 B1 | 4/2002 | Angelo et al. |
| 6,380,848 B1 | 4/2002 | Weigl et al. |
| 6,401,204 B1 | 6/2002 | Euchner et al. |
| 6,429,773 B1 | 8/2002 | Schuyler |
| 6,489,897 B2 | 12/2002 | Simon |
| 6,587,739 B1 | 7/2003 | Abrams et al. |
| 6,601,175 B1 | 7/2003 | Arnold et al. |
| 6,611,201 B1 | 8/2003 | Bishop et al. |
| 6,611,686 B1 | 8/2003 | Smith et al. |
| 6,615,186 B1 | 9/2003 | Kolls |
| 6,665,613 B2 | 12/2003 | Duvall |
| 6,714,859 B2 | 3/2004 | Jones |
| 6,717,527 B2 | 4/2004 | Simon |
| 6,741,927 B2 | 5/2004 | Jones |
| 6,804,606 B2 | 10/2004 | Jones |
| 6,812,829 B1 | 11/2004 | Flick |
| 6,816,089 B2 | 11/2004 | Flick |
| 6,816,090 B2 | 11/2004 | Teckchandani et al. |
| 6,828,692 B2 | 12/2004 | Simon |
| 6,868,386 B1 | 3/2005 | Henderson et al. |
| 6,870,467 B2 | 3/2005 | Simon |
| 6,873,824 B2 | 3/2005 | Flick |
| 6,888,495 B2 | 5/2005 | Flick |
| 6,917,853 B2 | 7/2005 | Chirnomas |
| 6,924,750 B2 | 8/2005 | Flick |
| 6,950,807 B2 | 9/2005 | Brock |
| 6,952,645 B1 | 10/2005 | Jones |
| 6,961,001 B1 | 11/2005 | Chang et al. |
| 6,972,667 B2 | 12/2005 | Flick |
| 6,985,583 B1 | 1/2006 | Brainard et al. |
| 6,993,658 B1 | 1/2006 | Engberg et al. |
| 7,005,960 B2 | 2/2006 | Flick |
| 7,015,830 B2 | 3/2006 | Flick |
| 7,020,798 B2 | 3/2006 | Meng et al. |
| 7,031,826 B2 | 4/2006 | Flick |
| 7,031,835 B2 | 4/2006 | Flick |
| 7,039,811 B2 | 5/2006 | Ito |
| 7,053,823 B2 | 5/2006 | Cervinka et al. |
| 7,061,137 B2 | 6/2006 | Flick |
| 7,091,822 B2 | 8/2006 | Flick et al. |
| 7,103,368 B2 | 9/2006 | Teshima |
| 7,123,128 B2 | 10/2006 | Mullet et al. |
| 7,124,088 B2 | 10/2006 | Bauer et al. |
| 7,133,685 B2 | 11/2006 | Hose et al. |
| 7,149,623 B2 | 12/2006 | Flick |
| 7,205,679 B2 | 4/2007 | Flick |
| 7,224,083 B2 | 5/2007 | Flick |
| 7,266,507 B2 | 9/2007 | Simon et al. |
| 7,299,890 B2 | 11/2007 | Mobley |
| 7,323,982 B2 | 1/2008 | Staton et al. |
| 7,327,250 B2 | 2/2008 | Harvey |
| 7,379,805 B2 | 5/2008 | Olsen, III et al. |
| 7,389,916 B2 | 6/2008 | Chirnomas |
| 7,561,102 B2 | 7/2009 | Duvall |
| 7,823,681 B2 | 11/2010 | Crespo et al. |
| 7,873,455 B2 | 1/2011 | Arshad et al. |
| 7,877,269 B2 | 1/2011 | Bauer et al. |
| 7,930,211 B2 | 4/2011 | Crolley |
| 8,018,329 B2 | 9/2011 | Morgan et al. |
| 8,095,394 B2 | 1/2012 | Nowak et al. |
| 8,140,358 B1 | 3/2012 | Ling et al. |
| 8,217,772 B2 | 7/2012 | Morgan et al. |
| 8,370,027 B2 | 2/2013 | Pettersson et al. |
| 2001/0040503 A1 | 11/2001 | Bishop |
| 2002/0019055 A1 | 2/2002 | Brown |
| 2002/0193926 A1 | 12/2002 | Katagishi et al. |
| 2003/0036823 A1 | 2/2003 | Mahvi |
| 2003/0151501 A1 | 8/2003 | Teckchandani et al. |
| 2003/0191583 A1 | 10/2003 | Uhlmann et al. |
| 2004/0088345 A1 | 5/2004 | Zellner et al. |
| 2004/0153362 A1 | 8/2004 | Bauer et al. |
| 2004/0176978 A1 | 9/2004 | Simon et al. |
| 2004/0177034 A1 | 9/2004 | Simon et al. |
| 2004/0203974 A1 | 10/2004 | Seibel et al. |
| 2004/0204795 A1 | 10/2004 | Harvey et al. |
| 2004/0239510 A1 | 12/2004 | Karsten |
| 2005/0017855 A1 | 1/2005 | Harvey |
| 2005/0033483 A1 | 2/2005 | Simon et al. |
| 2005/0134438 A1 | 6/2005 | Simon |
| 2005/0162016 A1 | 7/2005 | Simon |
| 2005/0270178 A1 | 12/2005 | Ioli |
| 2006/0059109 A1 | 3/2006 | Grimes |
| 2006/0108417 A1 | 5/2006 | Simon et al. |
| 2006/0111822 A1 | 5/2006 | Simon |
| 2006/0122748 A1 | 6/2006 | Nou |
| 2006/0136314 A1 | 6/2006 | Simon |
| 2007/0010922 A1 | 1/2007 | Buckley |
| 2007/0176771 A1 | 8/2007 | Doyle |
| 2007/0185728 A1 | 8/2007 | Schwarz et al. |
| 2007/0194881 A1 | 8/2007 | Schwarz et al. |
| 2008/0114541 A1 | 5/2008 | Shintani et al. |
| 2008/0162034 A1 | 7/2008 | Breen |
| 2008/0221743 A1 | 9/2008 | Schwarz et al. |
| 2009/0043409 A1 | 2/2009 | Ota |
| 2009/0182216 A1 | 7/2009 | Roushey, III et al. |
| 2010/0148947 A1 | 6/2010 | Morgan et al. |
| 2010/0268402 A1 | 10/2010 | Schwarz et al. |
| 2011/0050407 A1 | 3/2011 | Schoenfeld et al. |
| 2011/0057800 A1 | 3/2011 | Sofer |
| 2011/0084820 A1 | 4/2011 | Walter et al. |

FOREIGN PATENT DOCUMENTS

| | | |
|---|---|---|
| WO | 2007092272 | 8/2007 |
| WO | 2007092287 | 8/2007 |
| WO | 2010/068438 A2 | 6/2010 |

OTHER PUBLICATIONS

Schwarz et al. Office Action dated Aug. 21, 2009; U.S. Appl. No. 11/349,523, filed Feb. 7, 2006, p. 18.

Schwarz et al., Response to Office Action dated Aug. 21, 2009; filed Jan. 21, 2010; U.S. Appl. No. 11/349,523, filed Feb. 7, 2006, 36 p.

Schwarz et al., Final Office Action dated May 4, 2010; U.S. Appl. No. 11/349,523, filed Feb. 7, 2006, 19 p.

Schwarz et al., RCE and Response to Final Office Action dated May 4, 2010, filed Jul. 12, 2010; U.S. Appl. No. 11/1349,523, filed Feb. 7, 2006, 40 p.

Schwarz et al., Office Action dated Oct. 26, 2010; U.S. Appl. No. 11/349,523, filed Feb. 7, 2006, 16 p.

Schwarz et al., Response to Office Action dated Oct. 26, 2010, filed Feb. 21, 2011; U.S. Appl. No. 11/349,523, filed Feb. 7, 2006, 27 p.

Schwarz et al., Final Office Action dated Apr. 28, 2011; U.S. Appl. No. 11/349,523, filed Feb. 7, 2006, 17 p.

Schwarz et al., Preliminary Amendment filed Mar. 16, 2007; U.S. Appl. No. 11/539,292, filed Oct. 6, 2006, 28 p.

Schwarz et al., Office Action dated Jul. 22, 2009; U.S. Appl. No. 11/539,292, filed Oct. 6, 2006, 22 p.

Schwarz et al., Office Action dated May 14, 2010; U.S. Appl. No. 11/539,292 filed Oct. 6, 2006, 13 p.

(56) References Cited

OTHER PUBLICATIONS

Schwarz et al., Response to Office Action dated May 14, 2010, filed Jul. 12, 2010; U.S. Appl. No. 11/539,292 filed Oct. 6, 2006, 50 p.
Schwarz et al., Office Action dated Oct. 15, 2010; U.S. Appl. No. 11/539,292, filed Oct. 6, 2006, 13 p.
Schwarz et al., Response to Office Action dated Oct. 15, 2010 filed Feb. 15, 2011; U.S. Appl. No. 11/539,292, filed Oct. 6, 2006, 36 p.
Schwarz et al., Final Office Action dated May 26, 2011; U.S. Appl. No. 11/539,292, filed Oct. 6, 2006, 16 p.
Gordon*Howard Associates, Inc., International Search Report and Written Opinion of the International Searching Authority dated Nov. 29, 2007 in PCT Patent Application No. PCT/US07/02816, 6 p.
Gordon*Howard Associates, Inc., International Search Report and Written Opinion of the International Searching Authority dated Dec. 4, 2007 in PCT Patent Application No. PCT/US07/02840, 6 p.
On Time Payment Protection Systems, printed Jan. 2, 2004 from www.ontime-pps.com/how.html.
Aircept Products, printed Jan. 2, 2004 from www. aircept. com/products.html.
How PayTeck Works, printed Jan. 2, 2004 from www. payteck.cc/aboutpayteck.html.
Article: "Pager Lets You Locate Your Car, Unlock and Start It", published Dec. 10, 1997 in USA Today.
Article: "Electronic Keys Keep Tabs on Late Payers", published Sep. 22, 1997 in Nonprime Auto News.
Article: "PASSTEC Device Safely Prevents Vehicles from Starting", published Jul. 19, 1999 in Used Car News.
Payment Clock Disabler advertisement, published, May 18, 1998.
Secure Your Credit & Secure Your Investment (Pay Teck advertisement), printed Jan. 2, 2004 from www. payteck. cc.
iMetrik Company Information, printed Dec. 21, 2006 from imetrik.com.
About C-CHIP Technologies, printed Dec. 21, 2006 from www.c-chip.com.
HI-Tech tools to solve traditional problems, printed Dec. 21, 2006 from www.c-chip.com.
C-CHIP Technologies Products: Credit Chip 100, Credit Chip 100C, Credit Chip 200, printed Dec. 21, 2006 from www. c-chip.com.
The Credit Chip 100, printed Dec. 21, 2006 from www.c-chip.com.

METHODS AND SYSTEMS RELATED TO ESTABLISHING GEO-FENCE BOUNDARIES

CROSS-REFERENCE TO RELATED APPLICATIONS

This application is a continuation-in-part of U.S. patent application Ser. No. 13/364,662 for "AUTOMATED GEO-FENCE BOUNDARY CONFIGURATION AND ACTIVATION," filed Feb. 2, 2012, which was a continuation of U.S. patent application Ser. No. 13/215,732 filed Aug. 23, 2011 (now U.S. Pat. No. 8,164,431), which was a continuation of U.S. patent application Ser. No. 12/333,904 filed Dec. 12, 2008 (now U.S. Pat. No. 8,018,329). All related applications are incorporated herein by reference as if reproduced in full below.

BACKGROUND

Rental car companies and other vehicle owners may desire the ability to know when one of the rented cars has been involved in a collision, and if so, whether the renter of the vehicle (i.e., the driver), has taken appropriate after-collision action. Additionally, law enforcement may benefit from similar information. Thus, any invention which makes determining such information would provide a competitive edge in the marketplace.

BRIEF DESCRIPTION OF THE DRAWINGS

For a detailed description of exemplary embodiments, reference will now be made to the accompanying drawings in which.

NOTATION AND NOMENCLATURE

Certain terms are used throughout the following description and claims to refer to particular system components. As one skilled in the art will appreciate, different companies may refer to a component and/or method by different names. This document does not intended to distinguish between components and/or methods that differ in name but not in function.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device that connection may be through a direct connection or through an indirect connection via other devices and connections.

"Remote" shall mean one kilometer or more.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Various embodiments are direct to configuring and creating a geo-fence boundary around a vehicle, as well as monitoring the vehicle with respect to a collision and to the geo-fence boundary, and issuing an alert if necessary. In particular, a vehicle may be detected as being involved in a collision. If a collision has been detected, a geo-fence boundary is automatically established around the vehicle. If the vehicle improperly departs the geo-fence boundary, as may be the case in a hit-and-run type accident, an alert may be sent to an interested party regarding the improper movement of the vehicle. The specification first turns to an illustrative system.

Figure 1:
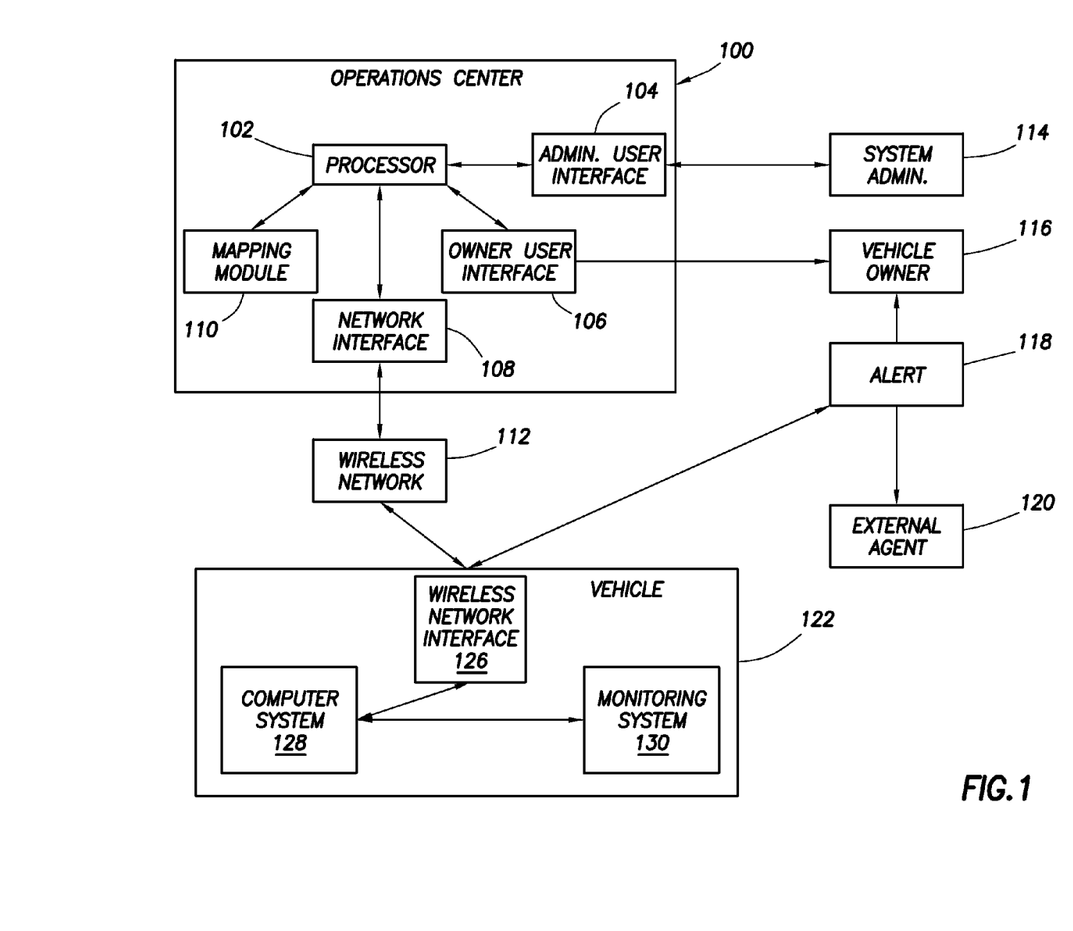
FIG. 1 shows, in block diagram form, an overall architecture of a system in accordance with at least some embodiments.

FIG. 1 shows, in block diagram form, a system in accordance with at least some embodiments. In particular, the system comprises an operations center 100 communicatively coupled to a vehicle 122 by way of a wireless network 112. The operations center 100 comprises a processor 102. In some embodiments, the processor 102 may be a stand alone computer system, or the processor may comprise a plurality of computer systems communicatively coupled and performing the functions of the operations center, the functions discussed more thoroughly below. The processor 102 may couple to an administrative user interface 104. The administrative user interface 104 may enable a system administrator 114 to control or configure the operation of the system. In some embodiments, the processor 102 may also couple to an owner user interface 106, which likewise enables an owner of the vehicle to interact with the system (e.g., to specify conditions in which a geo-fence should be activated, and to specify the types of alerts to be issued).

The operations center 100 may further comprise a mapping module 110 coupled to the processor 102. In accordance with at least some embodiments, the mapping module 110 is a stand alone computer system executing software to perform a mapping function associated with the location of the vehicle 122 and any geo-fence boundaries that may be established. In yet still other embodiments, the mapping module 110 may be a computer program or program package that operates or executes on the processor 102.

In order to communicate with the vehicle 122, the operations center may further comprise a network interface 108 communicatively coupled to the processor 102. By way of the network interface, the processor 102, and any programs executing thereon, may communicate with vehicle 122, such as by wireless network 112. Wireless network 112 is illustrative of any suitable communications network, such as a cellular network, a pager network, or other mechanism for transmitting information between the operations center 100 and the vehicle 122, and portions thereof may the Internet.

In accordance with at least some embodiments, the operations center 100 is remotely located from the vehicle 122. In some cases, the operations center 100 and vehicle 122 may be located within the same city or state. In other cases, the operations center 100 may be many hundreds or thousands of miles from vehicle 122, and thus the illustrative wireless network 112 may span several different types of communication networks.

Still referring to FIG. 1, the system further comprises a vehicle 122 communicatively coupled to operations center 100 by way of the illustrative wireless network 112. The vehicle 122 may comprise a computer system 128 communicatively coupled to a wireless network interface 126 and a monitoring system 130. The wireless network interface 126 enables the computer system 128 to communicate with operations center 100 by way of a wireless transmission from the wireless network 112. The monitoring system 130 may assist the computer system 128 and/or the operations center 100 in determining when the vehicle 122 has been involved in a collision, and also may assist the computer system 128 and/or the operations center 100 in determining when vehicle 122 may have improperly departed the scene of a collision. Various techniques for detecting a collision, as well as determining whether vehicle 122 has improperly departed the scene of a collision, will be discussed more thoroughly below.

In accordance with at least some embodiments, the operations center 100 may have the ability to issue alerts, such as alert 118, regarding collisions and geo-fence boundary violations. Alerts can be issued to any interested person, such as the vehicle owner 116 or a designated external agent 120. Alerts 118 can be transmitted using any suitable communications system, including electronic mail, short messaging service (SMS), instant messaging, automated telephone calls, and the like. Likewise, the vehicle 122, in some embodiments, may have the ability to directly issue alerts 118, such as by using wireless network interface 126. However, in other cases, any alerts 118 triggered by vehicle 122 may be passed by way of a wireless transmission through the wireless network 112 to the operations center 100 before being sent to the vehicle owner 116 or the designated external agent 120.

Figure 2A:
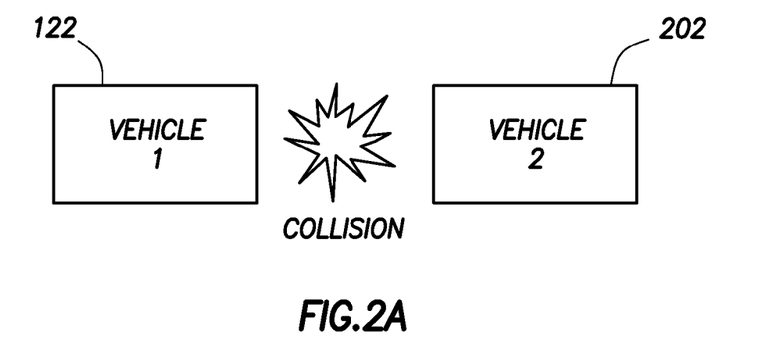
FIG. 2A shows, in block diagram form, an initial sequence of establishing a geo-fence in accordance with at least some embodiments.
Figure 2B:
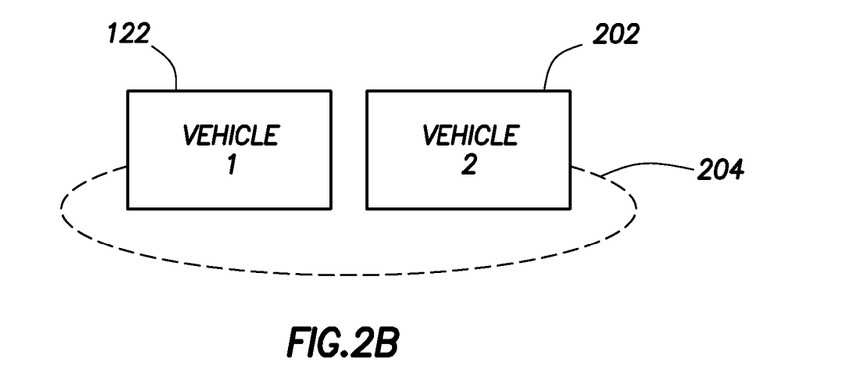
FIG. 2B shows, in block diagram form, an established geo-fence in accordance with at least some embodiments.
Figure 2C:
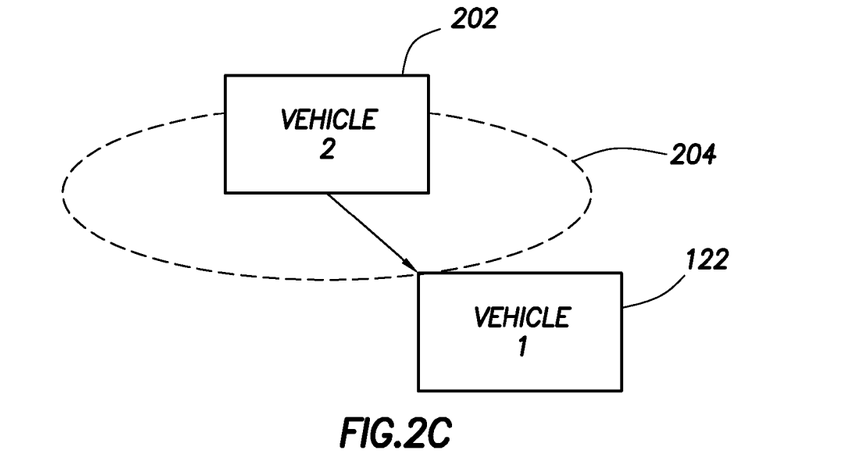
FIG. 2C shows, in block diagram form, a sequence of a vehicle leaving the established geo-fence boundary in accordance with at least some embodiments.

The specification now turns to a high level description of vehicle collision detection, automatically establishing a geo-fence boundary responsive to vehicle collision detection, and further detecting or determining when the vehicle 122 may have improperly departed the scene of a collision. In particular, FIGS. 2A, 2B, and 2C show a sequence of events related to various embodiments. FIG. 2A shows, in block diagram form, vehicle 122 being involved in a collision with vehicle 202. Detecting that vehicle 122 has been in a collision may take many forms, but for purposes of this portion of the disclosure, assume that the detection is by way of, at least in part, a device or devices in the monitoring system 130 coupled to the onboard computer 128. That is, either data gathered by the computer system 128 by way of the monitoring system 130 directly indicates that the vehicle 122 has been involved in a collision, or data gathered by the monitoring system 130 and communicated to the operations center 100 by the computer system 128, such as by way of a wireless transmission, is used by the operations center to determine that the vehicle 122 has been involved in a collision. Various example embodiments of methods and systems to detect that vehicle 122 has been involved in a collision will be discussed more thoroughly below.

Referring now to 2B, responsive to detection by computer system 128 that vehicle 122 has been in a collision, a geo-fence boundary 204 is automatically established around vehicle 122 at the time of the collision. More particularly, a geo-fence boundary 204 is automatically established that encompasses or encircles the location of the collision. The establishing is without, at the time of the collision, any input from an administrator, vehicle owner, or interested party. After the geo-fence boundary is established, the system monitors movement of the vehicle 122 with respect to the geo-fence boundary. At some point after the collision, the vehicle 122 crosses the geo-fence boundary 204, and if that crossing is indicative of the vehicle 122 improperly departing the scene of the collision, an alert may be issued to the owner of the vehicle 116, and/or the external agent 120. The specification now turns to various example embodiments of detecting that vehicle 122 has been involved in a collision.

Figure 3:
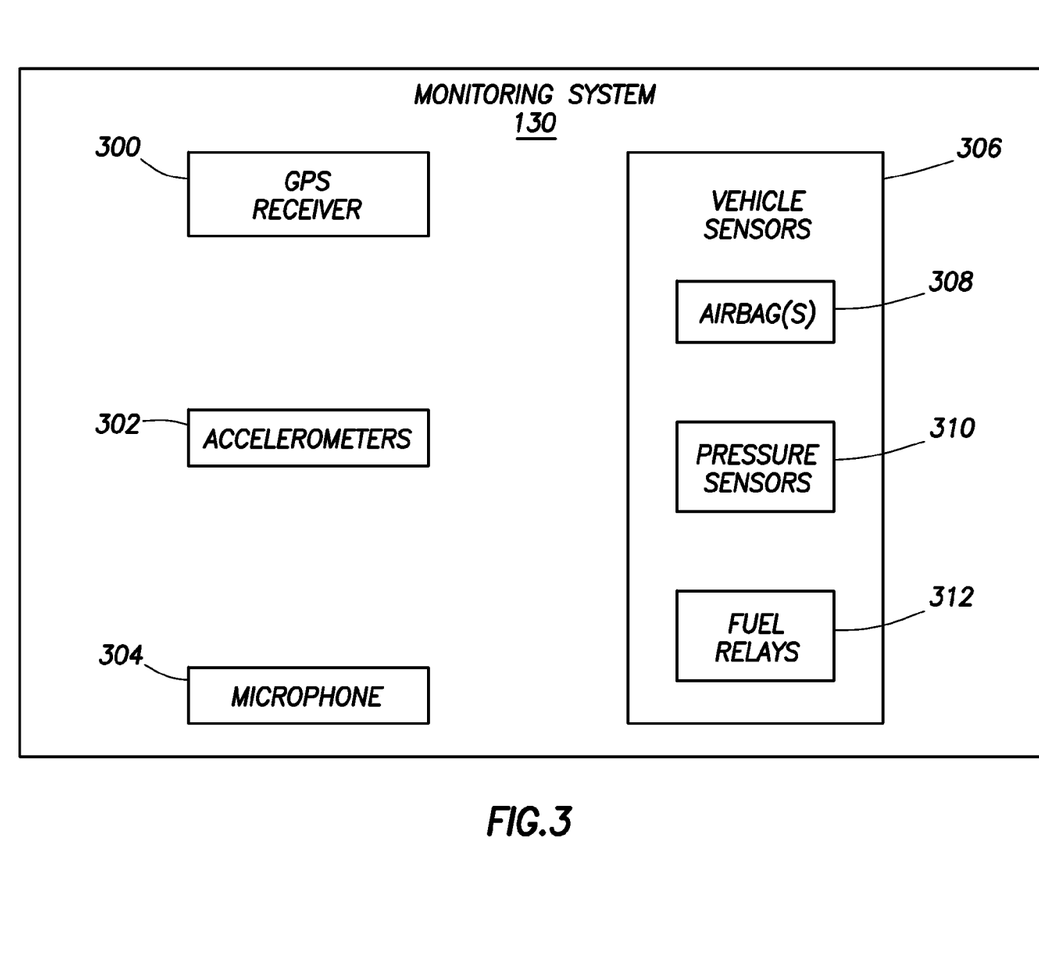
FIG. 3 shows, in block diagram form, a monitoring module in accordance with at least some embodiments.

FIG. 3 shows, in block diagram form, monitoring system 130 in greater detail. In particular, in accordance with at least some embodiments, the monitoring system 130 comprises a Global Positioning System (GPS) receiver 300. The GPS system comprises a plurality of satellites broadcasting very precise timing signals. The GPS receiver 300, receiving a plurality of the timing signals, may determine not only the location of the GPS receiver 300 (and thus, the vehicle 122) but also may also establish navigation information, such as speed, and direction of travel. In accordance with at least some embodiments, the navigation information derived from the GPS receiver 300 can be used to determine when the vehicle 122 has been involved in a collision. The determination using the navigation information derived by the GPS receiver 300 may take many forms. For example, in some systems a collision may be detected by monitoring the speed of the vehicle 122 as determined by the GPS receiver 300, and recognizing a sudden or unexpected deceleration over a short period of time (e.g., coming to a complete stop from 60 miles per hour in a fraction of a second). In yet other cases, the vehicle may not come to a complete stop, but may experience a sudden change of direction of the vehicle in the z-plane (i.e., the horizontal plane). For example, if the vehicle. 122 makes a sudden movement after hitting a stationary object (e.g., another car), or perhaps misses a curve and hits a barricade, the rate of change in direction of vehicle 122 may exceed a predetermined value within a predetermined time thus being indicative of a collision.

In some cases, the computer system 128 communicating with GPS receiver 300 may make the determination that the vehicle 122 has been in a collision. In other cases, however, the computer system 128 may read the data from the GPS receiver 300, and send the navigation data to the operations center 100 by the wireless network 112. Thus, in yet still other embodiments, the operations center 100 may make the determination that the vehicle 122 has been involved in a collision based on data sent from vehicle 122.

Still referring to FIG. 3, in addition to, or in place of, the GPS receiver 300, in accordance with at least some embodiments the monitoring system 130 may comprise one or more accelerometers 302 communicatively coupled to the computer system 128. In some embodiments, a single accelerometer may be sufficient for determining that the vehicle 122 has been involved in a collision. In other embodiments the accelerometers 302 may comprise a three-axis accelerometer, such that acceleration in all three dimensions can be determined. While a three-axis accelerometer 302 cannot determine absolute position, data read from a three-axis accelerometer may be helpful in determining when the vehicle has been in a collision. Consider, for example, the situation of a collision where the vehicle comes to a complete stop in a relatively short amount of time (e.g., coming to a complete stop from 60 miles per hour in a fraction of a second). In embodiments using an accelerometer, the deceleration rate of a vehicle exceeding the predetermined value may be indicative of the vehicle 122 being involved in a collision. Similarly, for collisions where the vehicle makes a sudden change of direction, embodiments using a three-axis accelerometer may be able to detect rate of change of direction in the z-plane exceeding a predetermined value within a predetermined time. While at some levels the determinations discussed with respect to the accelerometers are somewhat duplicative of the determinations that may be made using the GPS receiver 300, determinations using the accelerometers 302 may be made more quickly than the same determinations made using GPS receiver 300 in some instances. Moreover, in the particular case of a three-axis accelerometer, data from a three-axis accelerometer may be used to determine whether vehicle 122 has been involved in a roll-over accident; whereas, the data associated with GPS receiver 300 may not be suitable to establish the orientation of the vehicle either during or after a collision.

In yet still further embodiments, the monitoring system 130 may comprise a microphone 304 operatively coupled to the computer system 128. The microphone 304 may alone, or in combination with other elements within monitoring system 130, establish when the vehicle 122 has been involved in a collision. In particular, vehicle collisions in most cases involve sound, and in some cases rather significant amounts of sound. Thus, in accordance with at least some embodiments, establishing that the vehicle 122 has been involved in a collision may involve analysis of sounds either within the vehicle, outside of the vehicle, or both. For example, a significant collision may involve glass breakage. Glass breakage has a very distinctive sound which can be recognized and analyzed by computer systems based on frequencies above, below, and within the audible range. Thus, in some embodiments, the system may determine if the vehicle 122 has been involved in a collision based on the sound of breaking glass associated with the vehicle 122. In some cases, the sound of breaking glass alone may be sufficient to establish that the vehicle 122 has been in a collision; however, in other cases the sounds of breaking glass may be used to confirm an initial determination (e.g., a sudden deceleration determined by GPS receiver 300 or the accelerometers 302).

Further still, breaking glass is not the only sound that may be associated with a vehicle collision. In particular, a vehicle collision that involves crumple zones of an automobile may be associated with the sound of collapsing metal. In some cases the sound of collapsing metal may be analyzed in the audible range, but in other cases, the sound of collapsing metal may be established based on analysis of frequencies both above and below the audible level. Here again, in some cases, the sound of collapsing metal alone may be sufficient to establish that the vehicle 122 has been involved in a collision; however, in other cases the sound of collapsing metal may be used to confirm an initial determination by other systems within the monitoring system 130.

In yet still further embodiments, other sounds that may be associated with a vehicle in a collision may include the audible sounds of car horns detected by microphone 304, in conjunction with the GPS receiver 300 or the accelerometers 302 detecting a sudden deceleration or change in heading. In yet another embodiment, the microphone 304, in conjunction with the computer system 128, may detect and analyze the frictional sound of tires being dragged along the road as a result of the brakes being applied suddenly, which may also be indicative of vehicle 122 being involved in a collision. In yet still another embodiment, an increased decibel level of human speech, such as the decibel level reached when a person is screaming, may be detected and analyzed to confirm an initial determination by other systems within the monitoring system 130 that the vehicle 122 has been involved in a collision.

In some embodiments, computer system 128 may analyze the sounds itself, however, in other embodiments computer system 128 may send sound information to operations center 100 which, in turn, analyzes the received information to determine if there has been a collision.

Still referring to FIG. 3, monitoring system 130 may also comprise vehicle-specific sensors 306. In one embodiment, vehicle sensors 306 may comprise an airbag sensor 308 coupled to the computer system 128. If airbags are deployed, the computer system 128 or the operations center 100 may determine the vehicle 122 has been involved in a collision. Airbag deployment detected by the airbag sensor 308 may confirm an initial determination by other systems within the monitoring system 130 that vehicle 122 has been involved in a collision, or the airbag deployment detected by the airbag sensor 308, in and of itself, may indicate the vehicle has been involved in a collision.

In another embodiment, vehicle sensors 306 may comprise a pressure sensor 310, (e.g., in the driver's seat). The pressure sensor 310 may detect and analyze a change in pressure on the driver's seat which may indicate a driver was lifted off the seat upon an impact. Other pressure sensors may be found in other seats within the vehicle, or may be found in the headrests. The pressure change detected by the pressure sensor 310 may confirm an initial determination by other systems within the monitoring system 130 that the driver of the vehicle 122 has been involved in a collision, or the pressure change detected by the pressure sensor 310, in and of itself, may indicate the vehicle has been involved in a collision.

In still yet another embodiment, vehicle sensors 306 may comprise a fuel pump relay sensor 312 coupled to the computer system 128, in which the inertia of a collision switches off the fuel pump, or a safety switch associated with the fuel pump shuts off and sends a signal to the computer system 128 that a collision has occurred. The pump relay sensor 312 determination may confirm an initial determination by other systems within the monitoring system 130 that the driver of the vehicle 122 has been involved in a collision, or the fuel pump relay sensor 312 determination, in and of itself, may indicate the vehicle has been involved in a collision.

The specification now turns to a high level description of detecting a vehicle has improperly left the scene of a collision. Returning again to FIG. 2C, FIG. 2C shows, in block diagram form, vehicle 122 departing the geo-fence boundary 204 automatically established after the illustrative collision with vehicle 202. In some cases, detection of vehicle 122 improperly leaving the scene of the collision may include detecting that the vehicle 122 has moved outside the geo-fence 204 prior to the expiration of a predetermined time. Consider, as an example, that in FIG. 2C vehicle 122 is departing the geo-fence boundary without taking the steps that may be required after a collision, such as checking on the status of the other driver, exchanging insurance information, calling the authorities, or implementing a set of steps required by the administrator, vehicle owner, or third party. Thus, if a collision is detected, and a geo-fence boundary is breached by the vehicle before the expiration of a predetermined period of time, such as 20 seconds, the untimely departure may be indicative of the vehicle 122 improperly leaving the scene of the collision. In this example, a geo-fence alert may be issued for vehicle 122 improperly leaving the scene.

In another embodiment, detection of vehicle 122 improperly leaving the scene may include detecting that the vehicle 122 has crossed the geo-fence boundary without coming to a complete stop. A vehicle detected as having been in a collision, and not coming to a completely stop, may be indicative of a driver departing the scene to avoid responsibility. For example, a driver involved in a collision, and looking to act responsibly, is likely to stop and exit the vehicle to check on a variety of collision related issues such as injury or damage assessments, or to exchange information. A driver who is not interesting in taking the necessary steps after a collision may not stop the car at all, but instead continue to drive on after the collision.

In yet still another embodiment, detection of the vehicle 122 improperly leaving the scene may include detecting that the vehicle 122 departs the geo-fence boundary without indicia of responsible action, such as opening the driver's side door, or turning off the ignition of the vehicle between the collision and departing the geo-fence boundary. Detection that the driver's side door has not been opened after detection of a collision and before the vehicle 122 departing the boundary of the establish geo-fence is indicative of a driver not exiting the car to check on other people, exchange information, or engage in other after-collision steps. Likewise, if the ignition of a vehicle involved in a collision has not been turned off before the vehicle departs the boundary of the geo-fence, it may be likely the driver of the car did not stop the vehicle to engage in after-collision steps such as described previously.

The determination that a vehicle has improperly departed the scene may be made at any suitable location in the system. For example, the onboard computer 128 (in combination with the GPS receiver 300) may make the determination locally at the vehicle 122, without input from operations center. However, the operations center may provide data prior to the collision that the computer system 128 may use to establish the geo-fence once a collision is detected. In other cases, the computer system 128 reads location data and sends the location data to the operations center 100 contemporaneously with a collision. In turn, the operations center 100 makes the determination as to the location of the vehicle relative to the geo-fence. For example, mapping module 110 may be responsible for receiving location information, and comparing the location information to a geo-fence previously established. If the vehicle 122 departs the area bounded by the geo-fence, the mapping module 110 may inform the processor 102.

In addition to or in place of the functionality relating to geo-fence boundary violations, the mapping module 110 may also play a role in establishing the geo-fence at the time of the collision. For example, once a collision has been detected, the location of the vehicle 122 at the time of the collision may be provided to the mapping module 110, which determines the location (e.g., road, highway, parking lot) and then provides size and/or boundary information for the geo-fence. For example, the mapping module 110 may determine that the vehicle 122 resides on a parking lot at the time of the collision, and may provide a radius for the geo-fence based on the location, which example radius may be smaller than if the mapping module 110 determines that the vehicle is on a major freeway at the time of the collision.

Figure 4:
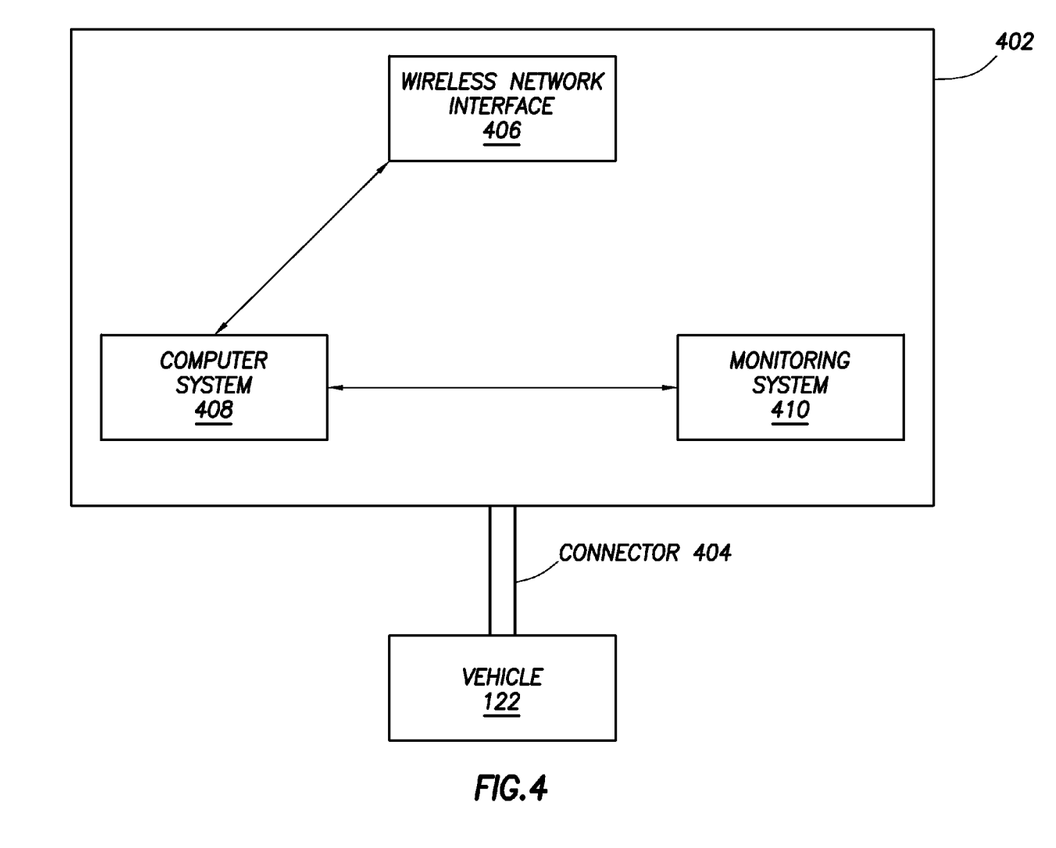
FIG. 4 shows, in block diagram form, an after-market system connected to a vehicle in accordance with at least some embodiments.

Referring now to FIG. 4, in some embodiments, the wireless network interface 126, computer system 128, and monitoring system 130 may be part of the vehicle 122 as a purchased from the manufacturer or dealer. In other embodiments, however, the wireless network interface, computer system, and monitoring system may be part of a third-party after-market system 402. In particular, FIG. 4 shows, in block diagram form, after-market system 402 coupled to vehicle 122 by way of an electrical connector 404. In some embodiments, the after-market system 402 may be mechanically coupled to the inside of a vehicle 122, such as within the dashboard. In other embodiments, the after-market system 402 may be coupled at any suitable location, such as within the engine compartment, or in the trunk.

Now the specification turns to the preconfiguration and specification of the geo-fence boundary. In particular, the size and shape of any geo-fence boundary that may be created responsive to a vehicle collision may be initially preconfigured by a system administrator, a vehicle owner, or an external agent before a vehicle is sold, rented, or otherwise turned over to a driver (e.g., prior to the vehicle being driven or being in a collision). The geo-fence boundary may be preconfigured as a region centered at the vehicle at the time of the collision and having a radius according to some predetermined configuration parameter. In one embodiment, the geo-fence boundary may have different shape, size, or other characteristics depending on various factors, such as but not limited to: owner or user defined preferences; system-wide settings; and administrator-defined preferences.

In the initial preconfiguration, the geo-fence boundary may preconfigured to be of an area significant in size to take into consideration movement of the vehicle that may not be indicative of improperly leaving the scene of a collision, so as to not issue a false alert. For example, the driver of a vehicle involved in a collision may move the car from the middle of the road so as not to block traffic, or inertial impact movement of the vehicle in conjunction with a collision may cause the vehicle to move. If the geo-fence boundary is preconfigured to be of a size and shape that does not take such movements into account, a false alert may be issued. Considering such possible movement, a geo-fence may be preconfigured, for example, to have a diameter of 50 feet when it is established at the time of a collision. A vehicle moving more than 50 feet without coming to a complete stop, without opening the driver side door, without stopping for a predetermined period of time, or the like, is more likely indicative of improperly leaving the scene, as opposed to movement associated with a collision.

In another embodiment, a geo-fence boundary may take into account the location of the collision if the location of the collision can be determined, such as by way of GPS location information. For example, a geo-fence boundary may be of a different size or shape if a collision occurs on a six-lane freeway versus a parking lot. Thus, in the initial preconfiguration of the geo-fence boundary, it may be possible to create scenario specific configurations. In particular, in a parking lot, driver of vehicle 122 may not have to move the vehicle very far, or at all, after a collision due to the amount of open space available. Thus, if a collision is detected as having occurred in a parking lot, and thus a parking lot specific geo-fence is established, the geo-fence boundary may be relatively small. On a six-lane freeway, by contrast, the distance necessary to travel to safely remove the vehicle from the middle of the road may be greater than that if a collision occurs in a parking lot. Comparing the two scenarios, a vehicle moving 50 feet from the collision in a parking lot may be more likely indicative of improperly leaving the scene of a collision than a vehicle moving 50 feet from the location of the collision on a six-lane freeway.

In yet another embodiment, the size of the geo-fence may be based on the speed of the vehicle at the time of the collision. For example, a geo-fence boundary established at the time of a collision for a vehicle traveling 5 miles per hour prior to the collision may only have a 50 feet diameter. In contrast, a geo-fence boundary established at the time of a collision for a vehicle traveling 60 miles per hour prior to the collision may have a 500 foot diameter. Because the geo-fence boundary establishes itself automatically around a vehicle that has been involved in a collision, if the location and/or speed of the vehicle and the collision cannot be determined at that time, the geo-fence boundary will be established based on default preconfiguration specifications.

Figure 5:
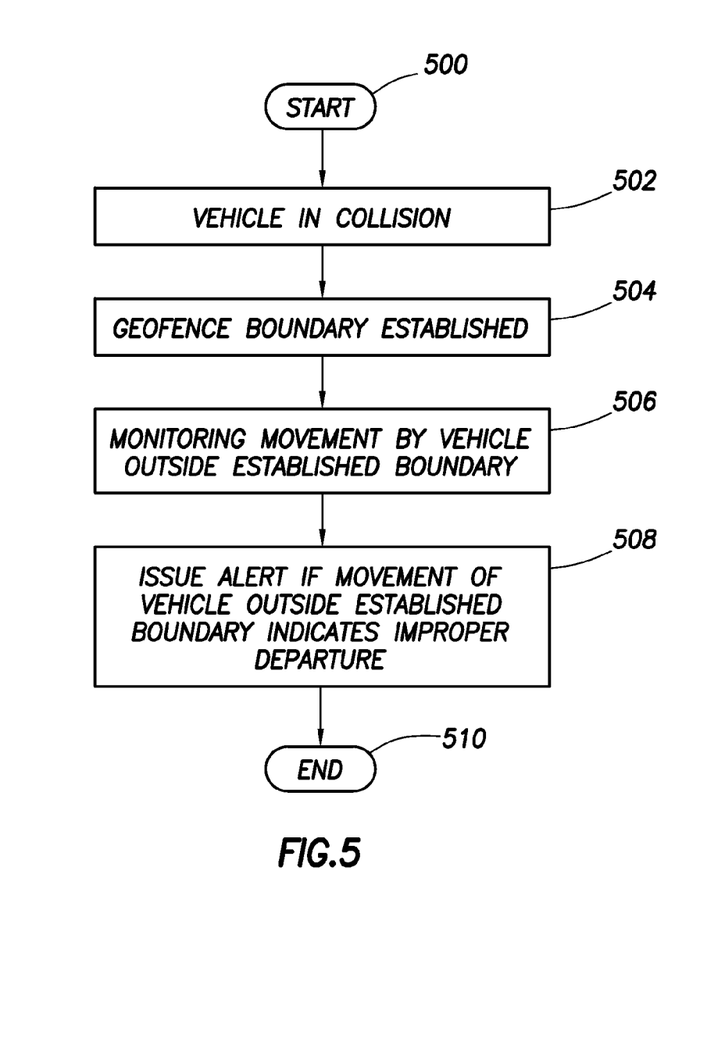
FIG. 5 shows, in block flow diagram form, a method in accordance with at least some embodiments.

The method of establish a geo-fence and issuing an alert will now be discussed in more detail. FIG. 5 shows a flow diagram depicting an overall method of establishing a geo-fence and issuing a geo-fence violation alert according to a sample embodiment. The method starts (block 500), and moves to determining the vehicle 122 has been involved in a collision (block 502). The collision may be with another vehicle 202 (or multiple vehicles), with a non-vehicle obstacle (e.g., a guard ran, light post), or the collision may occur without initially impacting an object, such as missing a curve. At the point a collision is detected, such as by the monitoring system 130, a geo-fence boundary is automatically established based on some predetermined configuration (block 504). Once the geo-fence is established, the monitoring system 130, in conjunction with the computer system 128, monitors movement of vehicle 122 with respect to the geo-fence boundary (block 506). If vehicle 122 leaves the scene of the collision improperly, such as may be the case in a hit-and-run accident, and crosses the geo-fence boundary, an alert is issued (block 508). Thereafter, the method ends (block 508).

Figure 6:
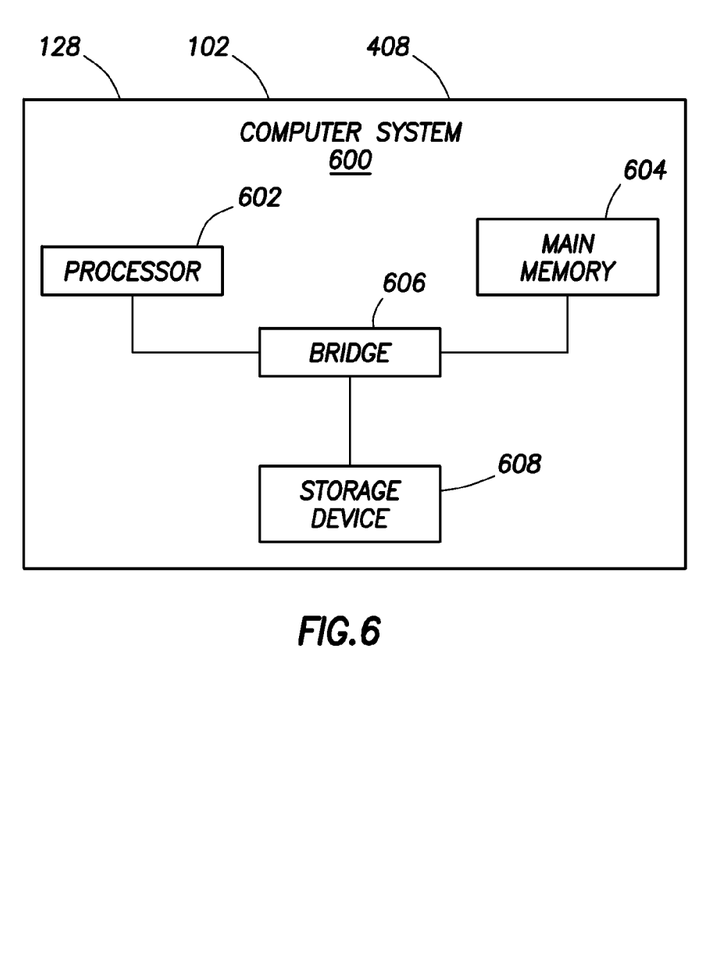
FIG. 6 shows a computer system in accordance with at least some embodiments.

FIG. 6 shows a computer system 600, which is illustrative of a computer system upon which the various embodiments may be practiced. The computer system 600 may be illustrative of, for example, computer system 128 coupled to the vehicle 122. In another embodiment, computer system 600 may be illustrative of processor 102. In yet another embodiment, the computer system could be illustrative of computer system 408 coupled to third-party after-market system 402. The computer system 600 comprises a processor 602, and the processor couples to a main memory 604 by way of a bridge device 606. Moreover, the processor 602 may couple to a long term storage device 608 (e.g., a hard drive, solid state disk, memory stick, optical disc) by way of the bridge device 606. Programs executable by the processor 602 may be stored on the storage device 608, and accessed when needed by the processor 602. The program stored on the storage device 608 may comprise programs to implement the various embodiments of the present specification, such as determining whether a vehicle has been in a collision, or if a vehicle has improperly left the boundary of an established geo-fence. In some cases, the programs are copied from the storage device 608 to the main memory 604, and the programs are executed from the main memory 604. Thus, both the main memory 604 and storage device 608 shall be considered computer-readable storage mediums.

From the description provided herein, those skilled in the art are readily able to combine software created as described with appropriate general-purpose or special-purpose computer hardware to create a computer system and/or computer sub-components in accordance with the various embodiments, to create a computer system and/or computer sub-components for carrying out the methods of the various embodiments and/or to create a non-transitory computer-readable medium (i.e., not a carrier wave) that stores a software program to implement the method aspects of the various embodiments.

References to "one embodiment," "an embodiment," "some embodiments," "various embodiments", or the like indicate that a particular element or characteristic is included in at least one embodiment of the invention. Although the phrases may appear in various places, the phrases do not necessarily refer to the same embodiment.

The above discussion is meant to be illustrative of the principles and various embodiments of the present invention. Numerous variations and modifications will become apparent to those skilled in the art once the above disclosure is fully appreciated. For example, while the various embodiments have been described in terms of collision scenario in which a vehicle improperly departs the scene of an accident. This context, however, shall not be read as a limitation as to the scope of one or more of the embodiments described—the same techniques may be used for other automatic geo-fence establishing and boundary violation detection. It is intended that the following claims be interpreted to embrace all such variations and modifications.

What is claimed is:

1. A method comprising:
   detecting a vehicle has been in a collision;
   establishing a geo-fence boundary for the vehicle responsive to the detecting;
   monitoring a movement of the vehicle with respect to the geo-fence boundary; and
   issuing an alert if movement of the vehicle outside the geo-fence boundary is indicative of improperly departing a scene of the collision.

2. The method of claim 1 wherein detecting the vehicle has been in a collision further comprises detecting the collision based on receiving a notification by way of a wireless transmission.

3. The method of claim 1 wherein detecting the vehicle has been in a collision further comprises detecting the collision based on Global Position System monitoring of the vehicle.

4. The method of claim 3 wherein detecting the collision by Global Position System monitoring further comprises detecting based on at least one selected from the group consisting of: a deceleration rate of the vehicle exceeding a predetermined value; and a change of direction of the vehicle in a z-plane exceeding a predetermined value within a predetermined time.

5. The method of claim 1 wherein detecting the vehicle has been in a collision further comprises detecting the collision based on at least one selected from the group consisting of: information read from a computer system of the vehicle; information related to airbag deployment; information related to a fuel relay shutoff; a change in pressure on a driver's seat; and a change in pressure against a driver's headrest.

6. The method of claim 1 wherein detecting the vehicle has been in a collision further comprises detecting the collision based on movement detected by a three-axis accelerometer associated with the vehicle.

7. The method of claim 6 wherein detecting the collision by the three-axis accelerometer further comprises detecting based on at least one selected from the group consisting of: deceleration rate of the vehicle exceeding a predetermined value; and a change of direction of the vehicle in a z-plane exceeding a predetermined value within a predetermined time.

8. The method of claim 1 wherein detecting the vehicle has been in a collision further comprises detecting the collision based on a sound proximate to the vehicle.

9. The method of claim 8 wherein detecting the collision based on a sound further comprises detecting the sound being at least one selected from the group consisting of: an audible sound; a sound of breaking glass; and a sound of collapsing metal.

10. The method of claim 1 wherein issuing the alert further comprises issuing the alert when movement of the vehicle outside the geo-fence boundary is at least one selected from the group consisting of: within a predetermined period of time; without first coming to a complete stop; without opening the driver's side door; and without turning off the ignition.

11. A system comprising:
a processor;
a memory coupled to the processor, the memory storing a program that, when executed by the processor, causes the processor to:
detect a vehicle has been in a collision;
establish a geo-fence boundary for the vehicle; and
issue an alert if movement of the vehicle outside the geo-fence is indicative of improperly exiting a scene of the collision.

12. The system of claim 11, further comprising:
a receiver coupled to the processor, the receiver configured to receive a wireless transmission;
wherein when the processor detects, the program causes the processor to detect based on receiving a notification by way of the receiver.

13. The system of claim 11, further comprising:
a Global Positioning System receiver coupled to the processor;
wherein when the processor detects, the program causes the processor to detect the collision based on location data read from the Global Position System receiver.

14. The system of claim 13 wherein when the processor detects, the program causes the processor to detect based on at least one selected from the group of: a deceleration rate of the vehicle exceeding a predetermined value; and a change of direction of the vehicle in the z-plane exceeding a predetermined value within a predetermined time.

15. The system of claim 11, further comprising:
a connector configured to couple to a computer system of a vehicle;
wherein when the processor detects the vehicle has been in a collision, the program causes the processor to detect based on at least one selected from the group consisting of: information read from a computer system of the vehicle; information related to airbag deployment; information related to a fuel relay shutoff; a change in pressure on a driver's seat; and a change in pressure against a driver's headrest.

16. The system of claim 11, further comprising:
a three-axis accelerometer coupled to the processor;
wherein when the processor detects the vehicle has been in a collision, the program causes the processor to detect the collision based on movement detected by the three-axis accelerometer.

17. The system of claim 16 wherein when the processor detects the vehicle has been in a collision, the program causes the process further to detect based on at least one selected from the group consisting of: deceleration rate of the vehicle exceeding a predetermined value; and a change of direction of the vehicle in the z-plane exceeding a predetermined value within a predetermined time.

18. The system of claim 11, further comprising:
a microphone coupled to the processor;
wherein when the processor detects the vehicle has been in a collision, the processor further detects the collision based on a sound proximate to the vehicle received by the microphone.

19. The system of claim 18 wherein when the processor detects the vehicle has been in a collision, the program causes the processor to recognize is at least one selected from the group consisting of: a sound of breaking glass; and a sound of collapsing metal.

20. The system of claim 11 wherein when the processor issues the alert, the program causes the processor to issue the alert when movement of the vehicle outside the geo-fence boundary is at least one selected from the group consisting of: within a predetermined period of time; without first coming to a complete stop; without opening the driver's side door; and without turning off the ignition.

21. The system of claim 11 wherein the system is an electronic device physically coupled to a vehicle.

* * * * *